(12) United States Patent
Frommer

(10) Patent No.: US 6,250,483 B1
(45) Date of Patent: Jun. 26, 2001

(54) PORTABLE BIG GAME HOIST/FIELD PROCESSING UNIT

(76) Inventor: John C. Frommer, 3730 Thom Blvd., Las Vegas, NV (US) 89130

( * ) Notice: Subject to any disclaimer, the term of this patent is extended or adjusted under 35 U.S.C. 154(b) by 0 days.

(21) Appl. No.: 09/632,887

(22) Filed: Aug. 7, 2000

(51) Int. Cl.$^7$ ..................................................... A22B 1/00
(52) U.S. Cl. ........................... 212/180; 414/462; 452/189
(58) Field of Search .................................. 414/543, 462; 212/180, 291; 452/187, 189

(56) References Cited

U.S. PATENT DOCUMENTS

| | | | | |
|---|---|---|---|---|
| 3,236,394 | * | 2/1966 | McMullen | 212/66 |
| 3,966,065 | * | 6/1976 | Jones | 212/138 R |
| 4,004,778 | * | 1/1977 | Steinhagen | 254/142 |
| 4,440,202 | * | 4/1984 | Everett | 144/2 Z |
| 4,806,063 | * | 2/1989 | York | 414/462 |
| 5,752,799 | * | 5/1998 | Carey et al. | 414/543 |
| 5,788,095 | * | 8/1998 | Watson | 212/180 |
| 5,791,858 | * | 8/1998 | Sasser | 414/462 |
| 6,095,349 | * | 8/2000 | O'Meara | 212/180 |
| 6,109,855 | * | 8/2000 | Vela-Cuellar | 414/462 |
| 6,138,991 | * | 10/2000 | Myers | 254/323 |
| 6,152,675 | * | 11/2000 | Compton | 414/543 |
| 6,155,771 | * | 12/2000 | Montz | 414/543 |

* cited by examiner

Primary Examiner—Thomas J. Brahan
(74) Attorney, Agent, or Firm—Frank J. McGue

(57) ABSTRACT

A field hoist includes a support having a post extending upwardly therefrom. A base is slidably received over the post and is freely rotatable about an axis defined by the post. The base has a winch and pivot lock mounted thereto. The pivot lock engaging and disengaging the post and the base in a desired angular orientation with respect to the axis. An angled upright has a vertical portion which is telescopically received within the base. The angled upright has a sleeve extending upwardly atop the vertical portion at a preselected angle towards the side of the base having the winch mounted thereon. A support extension is slidably received within the sleeve and extends therefrom. A winch cable has a hook mounted at one end thereof, the other end of the winch cable being attached to the winch. The winch cable extending upwardly to the sleeve, upwardly along the sleeve and the support extension, and lastly extending downwardly from the end of the support extension. An animal hanger is provided on the hook.

20 Claims, 4 Drawing Sheets

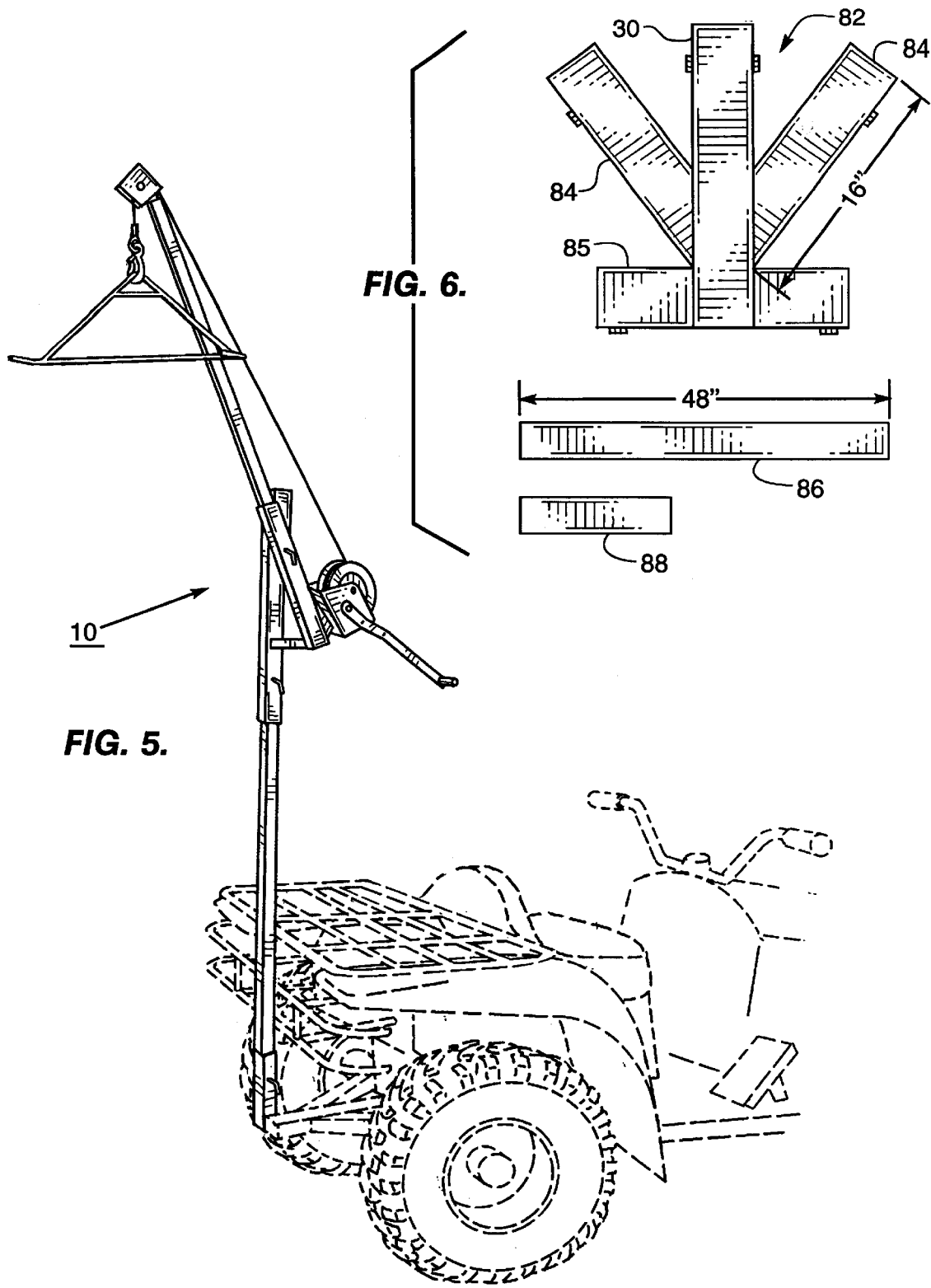

PORTABLE BIG GAME HOIST/FIELD PROCESSING UNIT

TECHNICAL FIELD

This invention relates to hoists, and, more particularly, to a hoist for big game which is portable and mounts on a truck, all terrain vehicle (ATV) or a stand on the ground as desired.

BACKGROUND OF THE INVENTION

Big game hunting is a popular outdoor recreation in the United States. However, once an animal is taken, the problem becomes what to do with the carcass. In hunting season, it is common to see animal carcasses draped over the hoods of automobiles or laid out in the beds of pickup trucks. However, transporting a carcass in such a fashion is dirty and quite unsanitary. It is far more preferable for the animal to be dressed out before transportation.

However, field dressing a large animal is not an easy task. Moving the animal around to properly field dress is difficult and unpleasant. Thus, the need for a portable hoist to assist in dressing the animal is well known in the field.

Various types of hoists have been described in the patent literature.

U.S. Pat. No. 5,791,858 entitled "Vehicle Mounted Game Skinning Device" which issued Aug. 11, 1998 to Sasser shows a device comprising an adjustable vertical support having a hitch connection member and a slidably received boom arm and winch unit. Also provided is a game gambrel for raising and lowering game animals. The support arm is collapsible.

U.S. Pat. No. 4,806,063 entitled "Portable Wild Game Hoist" which issued on Feb. 21, 1989 to York shows a portable wild game hoist having a boom comprised of a plurality of mating sections. The cylindrical section 17 is mounted to a trailer hitch ball 57.

U.S. Pat. No. 5,752,799 entitled "Apparatus for Loading and Carrying Small Recreational Water Vehicles and Method Therefor" which issued on May 19, 1998 to Carey et al. provides a lifter apparatus having a rotation mechanism 22 which has a lower portion 38 of a main support which extends through the center of base plate 24 and locking base 28. The main support 20 is also connected to the opposite end of locking base 28 and support tube 50 is adjustable received by main support 20.

U.S. Pat. No. 5,211,526 entitled "Mobile Crane" which issued on May 18, 1993 to Robbinette shows another mobile crane rotatably mounted to the rear of a truck.

None of the known prior art disclose the device set forth herein.

SUMMARY OF THE INVENTION

It is an object of this invention to provide an improved portable big game hoist for use in the field.

It is a further object of this invention to provide an improved game hoist which can be assembled and disassembled easily and quickly in the field.

Further objects and advantages of the invention will become apparent as the following description proceeds and the features of novelty which characterize this invention will be pointed out with particularity in the claims annexed to and forming a part of this specification.

BRIEF DESCRIPTION OF THE DRAWINGS

The present invention may be more readily described by reference to the accompanying drawings in which:

FIG. 5 is a perspective view of the embodiment of FIG. 4 mounted to an ATV; and

FIG. 6 is a perspective view of a tripod used in the present invention.

DESCRIPTION OF THE PREFERRED EMBODIMENT

Figure 1:
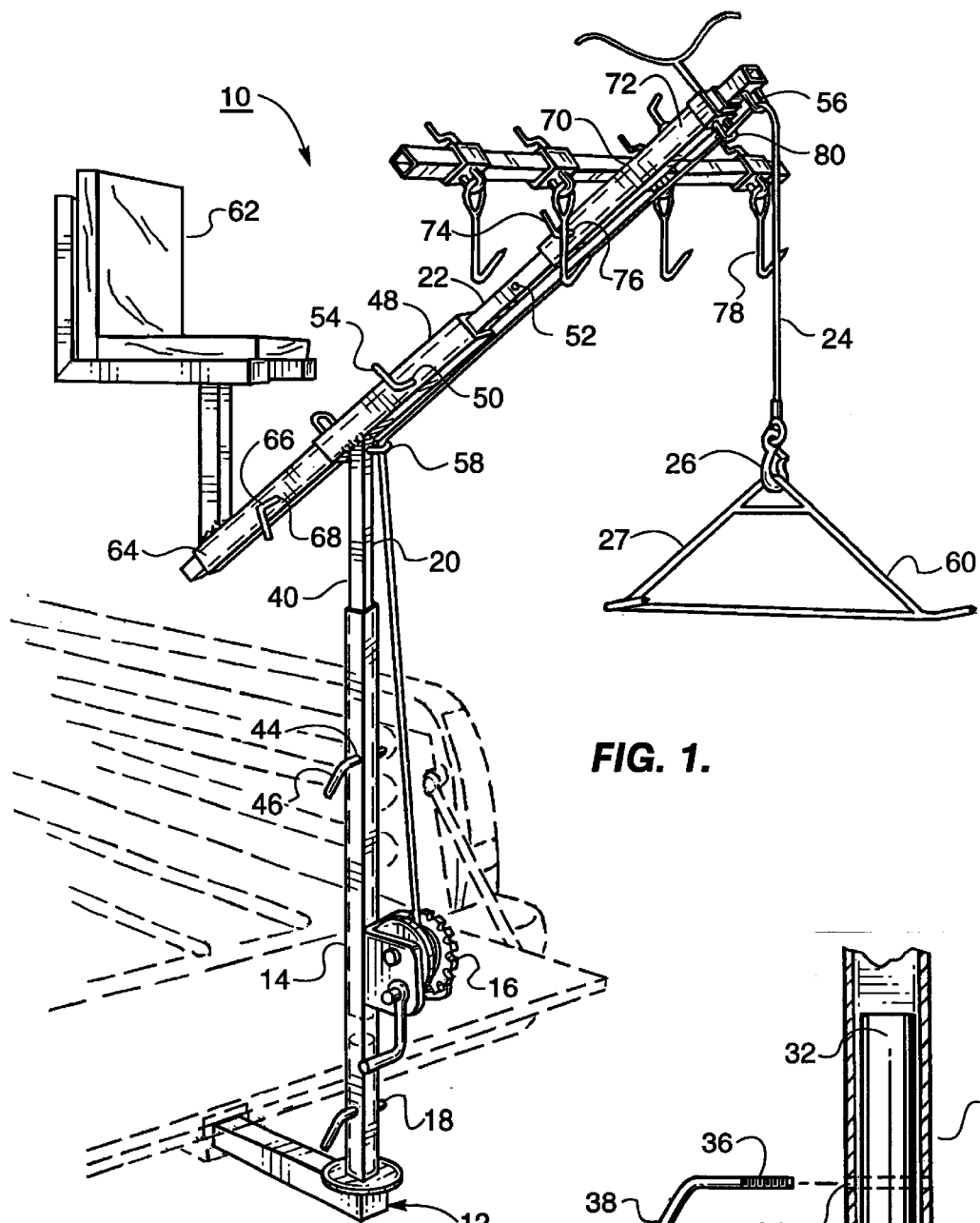
FIG. 1 is a perspective view of one embodiment of the present invention mounted to a pickup truck.
Figure 2:
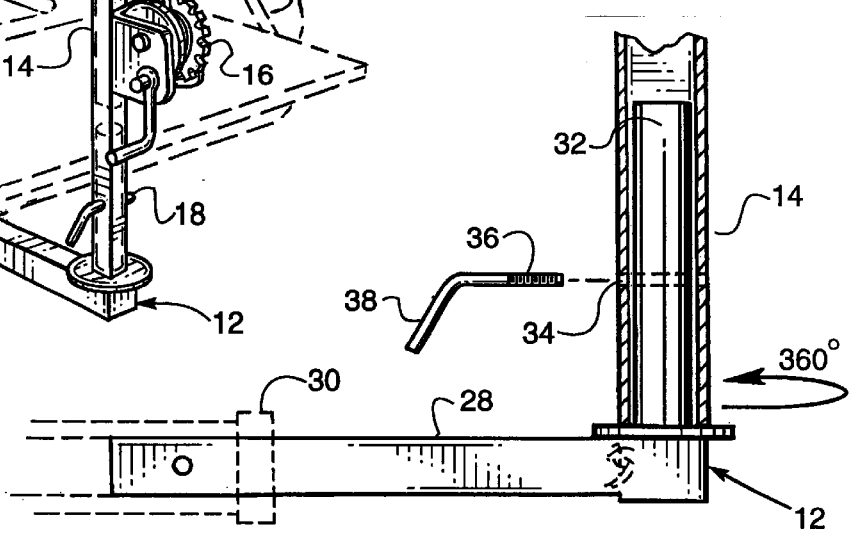
FIG. 2 is a partial cross sectional side view showing detail as the mounting of the device to the truck.
Figure 3:
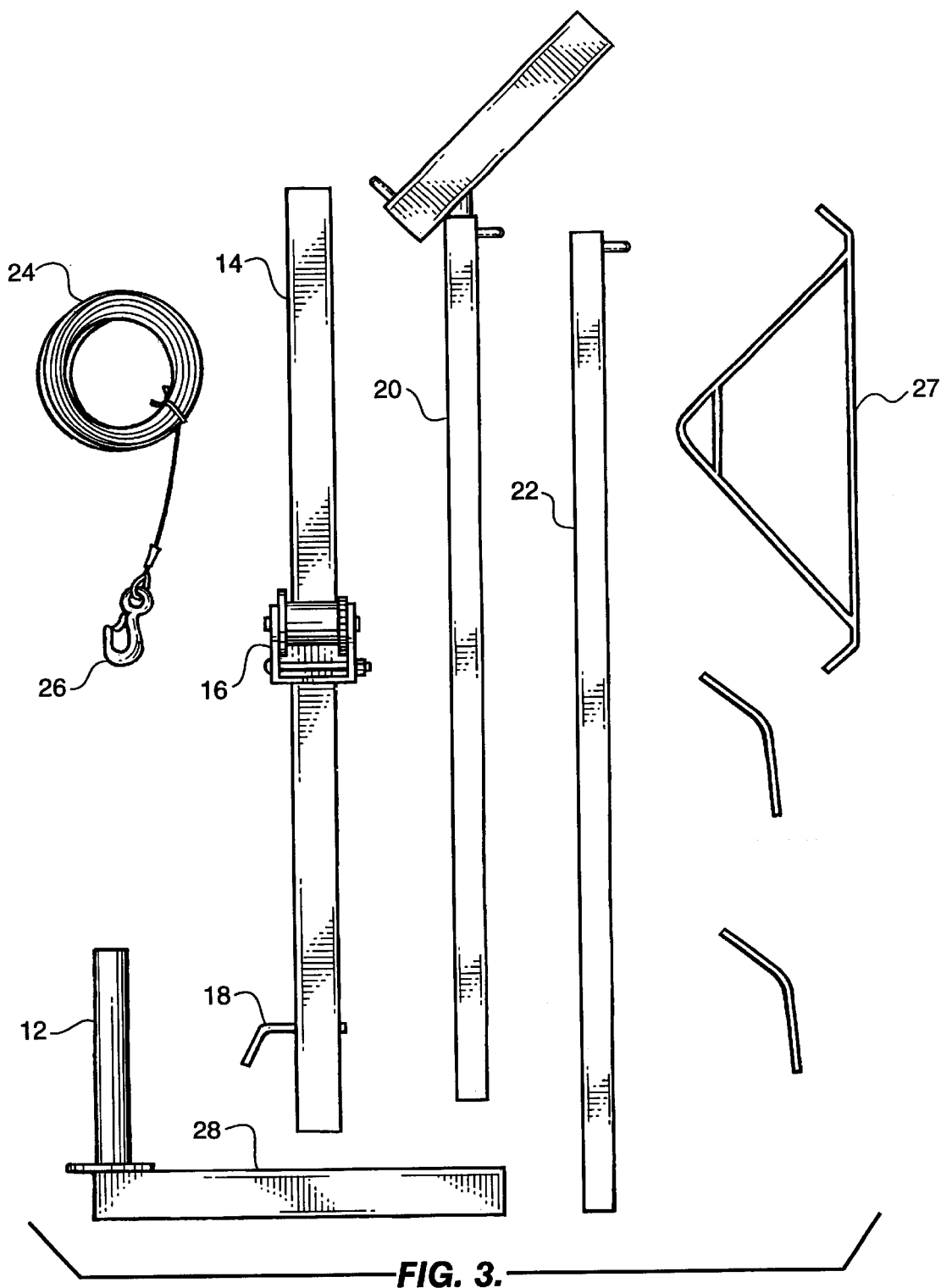
FIG. 3 is an exploded view of another embodiment of the present invention.

Referring more particularly to the drawings by characters of reference, FIGS. 1–3 disclose one embodiment of a big game hoist 10 for use in connection with dressing large game animals (not shown) in the field. It should be understood that while the present discussion relates to big game hoist 10 having the illustrated configuration, the principles of the invention are equally applicable to other configurations.

As best seen in FIG. 3, the embodiment of big game hoist 10 viewed therein comprises a receiver adapter 12, a base 14 having a winch 16 and a means for locking a pivot 18 mounted thereto, an angled upright 20, support extension 22, winch cable 24 having a hook 26 mounted at one end thereof, and a means for hanging an animal 27.

Receiver adaptor 12 is an L-shaped piece in which one end of a horizontal leg 28 is adapted to be received into a vehicle receiver 30 used as a trailer hitch as best seen in FIG. 2. A post 32 extends upwardly from the other end of leg 28 forming the vertical portion of the L-shaped receiver adaptor 12.

Base 14 is a hollow piece adapted to be slidably received over post 32, with post 32 extending into, preferably, only a small portion of the length of base 14. Base 14 is freely rotatable about an axis defined by post 32 when mounted thereon. Pivot locking means allows a user to position and lock base 14 to a desired angular orientation with respect to post 32. In the presently preferred embodiment, post 32 is a cylinder while base 14 is comprised of square tubing. Winch 16 is mounted to base 14 at about, preferably, its midpoint.

In the embodiment of FIGS. 1–3, pivot locking means 18 comprises a threaded hole 34 positioned in the lower portion of base 14 which receives post 32. A corresponding threaded pin 36 extends through hole 34 and, when engaging post 32, frictionally locks post 32 and base 14 to each other. Threaded pin 36 is provided with a handle 38 extending laterally therefrom to allow a user to engage and disengage pivot locking means 18 from post 32 as desired.

Those skilled in the art will recognize that other pivot locking means 32 are possible and that the present invention is not limited to the particular method described herein.

Angled upright 20 includes a vertical portion 40 which is telescopically received within base 14. A first pair of aligned holes 42 extend through opposing sides of vertical portion 40 proximate to the bottom thereof. A first plurality of pairs of corresponding holes 44 extend through opposing sides of base 14. To adjust vertical portion to a desired height, vertical portion 40 is slid in base 14 until the first pair of aligned holes 42 are aligned with the one of said first plurality of pairs of corresponding holes 44 corresponding to the desired height. A first pin 46 is extended through holes 42 and 44 to lock vertical portion 40 to that position on base 14.

Extending upwardly atop vertical portion 40 at a preselected angle towards the side of base 14 having winch 16 mounted thereon is a sleeve 48. In the presently most preferred embodiment, the preselected angle is about 45 degrees. Sleeve 48 is preferably hollow square tubing which slidably receives support extension 22.

A second pair of aligned holes 50 extend through opposing sides of sleeve 48 proximate to the middle thereof. A second plurality of pairs of corresponding holes 52 extend through opposing sides of support extension 22. To adjust support extension 22 to a desired length, support extension 22 is slid within sleeve 48 until the second pair of aligned holes 50 are aligned with the one of said second plurality of pairs of corresponding holes 52 corresponding to the desired length. A second pin 54 is extended through holes 50 and 52 to lock support extension 22 to that position on sleeve 48.

A support extension eyelet 56 is provided at the uppermost portion of support extension 22 and extends downwardly therefrom. An angled upright eyelet 58 is provided at the junction of vertical portion 40 and sleeve 48 directly above winch 16.

The end of winch cable 24 opposite hook 26 is strung through support extension eyelet 56, angled upright eyelet 58 and hence to winch 16 where it is captured thereby. Hook 16 is used to attach animal hanger means 28, as, for example, a spreader 60.

One advantage of the present invention is the ability to attach a wide variety of accessories thereto as best seen in FIG. 1. For example, a chair 62 mounted to a chair sleeve 64 is slid over the lower end of support extension 22 and secured thereto via chair pin 66 and corresponding holes 68. A bar 70 mounted to a bar sleeve 72 is slid over the upper end of support extension 22 and secured thereto by bar pin 74 and corresponding holes 76. Bar 70 extends laterally from support extension 22 and supports a plurality of meat hooks 78 therefrom. A bar eyelet 80 is optionally provided to further support winch cable 24.

The other advantages are the ability to adjust the height of vertical portion 40, to adjust the length of the support extension 22 and to rotate the entire device about post 32 to any desired angular orientation. So, for example, a user can back up a pickup truck to a downed game animal, mount the animal to spreader 60 and hoist upward to a working position. Once the animal is dressed, the entire mechanism can be rotated to allow the user to place the carcass in the bed of the truck to which hoist 10 is mounted.

As shown in FIG. 6, For those areas that a vehicle simply cannot reach, a stand 82 is provided comprising two angled legs 84 and a cross leg 85 resting on the ground and a receiver 30' centered thereon. Long extenders 86 or short extenders 88 are inserted into legs 84 or 85 to provide added stability. Receiver 30' functions identically to vehicle receiver 30 and the operation of hoist 10 is otherwise identical to that described above.

Figure 4:
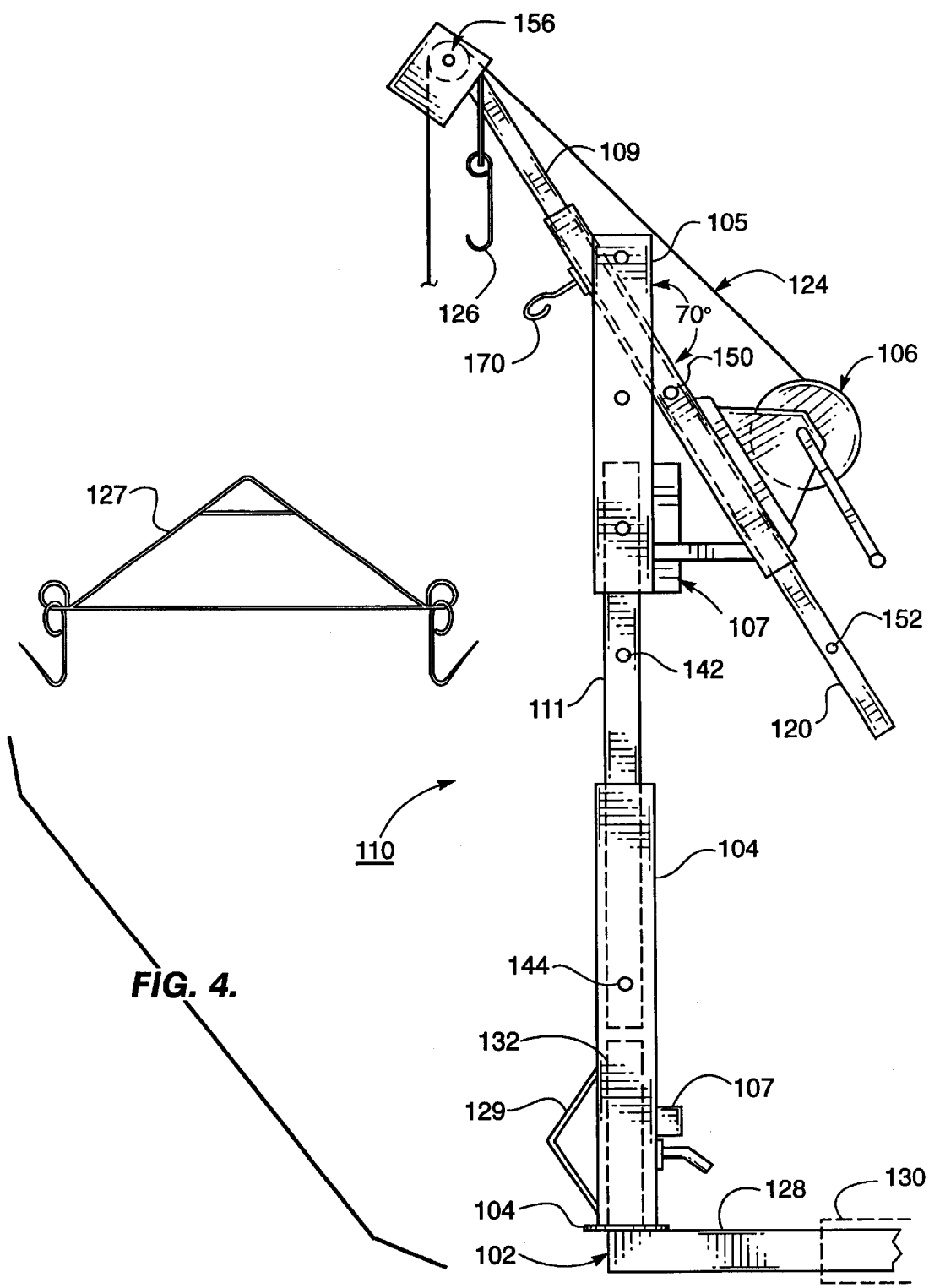
FIG. 4 is a side partial cross sectional view of still another embodiment of the present invention.

Turning now to the embodiment illustrated in FIGS. 4–5, big game hoist 100 viewed therein comprises a receiver adapter 102, a base 104 having an angled upright 105 slidably mounted at one end thereof, angled upright 105 comprising a boom storage collar 107, an angled portion 109 and a vertical portion 111, and an angled portion 109 having a winch 106 mounted thereto. Hoist 100 further having a boom 120, a winch cable 124 having a hook 126 mounted at one end thereof, and a means for hanging an animal 127.

As in the previously described embodiment of FIGS. 1–3, receiver adaptor 102 is an L-shaped piece in which one end of a horizontal leg 128 is adapted to be received into a vehicle receiver 130 used as a trailer hitch as best seen in FIG. 5. A post 132 extends upwardly from the other end of leg 128 forming the vertical portion of the L-shaped receiver adaptor 102.

Base 104 is a hollow piece adapted to be slidably received over post 132, with post 132 extending into, preferably, only a small portion of the length of base 104. Base 104 is freely rotatable about an axis defined by post 132 when mounted thereon.

Vertical portion 111 of angled upright 105 is slidably mounted to base 104 whereby angled portion 109 extends upwardly and angularly at a preselected angle therefrom. Winch 106 is mounted to angled portion 111 at about, preferably, its midpoint. In the presently most preferred embodiment, the preselected angle is about 60 degrees. Angled portion 109 and vertical portion 111 are preferably hollow square tubing. Angled portion 109 is adapted to slidably receive boom 120 while vertical portion 111 is adapted to slidably receive base 104.

A pair of aligned holes 150 extend through opposing sides of angled portion 109 proximate to the middle thereof. Another pair of corresponding holes 152 extend through opposing sides of boom 120 at the lower end thereof. To mount boom 120 to angled upright 105, boom 120 is slid within angled portion 109 until the pair of aligned holes 150 are aligned with the corresponding holes 152. A quick pin 154 is extended through holes 150 and 152 to lock boom 120 to that position on angled portion 109. A cotter pin 155 holds quick pin 154 in place.

Boom 120, when not in use, is slidably received within boom storage collar 107 which is mounted at roughly the midpoint of vertical portion 111. A second pair of aligned holes 160 extend through opposing sides of boom storage collar 107 proximate to the middle thereof. Another pair of corresponding holes 162 extend through opposing sides of boom 120 at about its midpoint. To store boom 120 in boom storage collar 107, boom 120 is slid within boom storage collar 107 until the pair of aligned holes 160 are aligned with the corresponding holes 162. Quick pin 154 is extended through holes 160 and 162 to lock boom 120 to that position on boom storage collar 107. Cotter pin 155 holds quick pin 154 in place therein.

A roller 156 is provided at the uppermost portion of boom 120. The end of winch cable 124 opposite hook 126 is strung through roller 156 and hence to winch 116 where it is captured thereby. Hook 126 is used to attach animal hanger means 129, as, for example, spreader 60.

Angled portion 111 is telescopically received within base 104. A third pair of aligned holes 142 extend through opposing sides of vertical portion 111 proximate to the bottom thereof. A first plurality of pairs of corresponding holes 144 extend through opposing sides of base 104. To adjust vertical portion 111 to a desired height, vertical portion 111 is slid in base 104 until the third pair of aligned holes 142 are aligned with the one of said first plurality of pairs of corresponding holes 144 corresponding to the desired height. A second quick pin 146 is extended through holes 142 and 144 to lock vertical portion 111 to that position on base 104. A second cotter pin 149 holds second quick pin 146 in place.

To allow a user to employ winch 116 to assist in skinning an animal, an S hook 170 is mounted on boom 120 proximate to roller 156. Once an animal is mounted to spreader 60 and hoisted upwardly via winch 116, the weight of spreader 60 can be taken up by S hook 170 and winch cable 124 disconnected therefrom.

Winch cable 124 is strung from roller 156 downwardly to a bottom eyelet mounted on the bottom of base 104. Winch cable 124 is then directed upwardly to the animal where it is attached thereto via hook 174. When winch cable 124 is wound back upon winch 116, the skin of the animal is removed with a mechanical assist from winch 116. Note that due to the stretching of the skin, hook may need to be reattached at different points on the animal's skin.

Although only certain embodiments have been illustrated and described, it will be apparent to those skilled in the art that various changes and modifications may be made therein without departing from the spirit of the invention or from the scope of the appended claims.

What is claimed is:

1. A field hoist for dressing an animal is provided, the field hoist comprising:

means for supporting the field hoist, the support means having a post extending upwardly therefrom, a base being slidably received over the post, the base having a winch and a means for locking a pivot mounted thereto, the base being freely rotatably about an axis defined by the post, the pivot locking means adapted to engage and disengage the post and the base in a desired angular orientation with respect to the axis, an angled upright having a vertical portion which is telescopically received within the base, the angled upright having a sleeve extending upwardly atop the vertical portion at a preselected angle;

a support extension being slidably received within the sleeve, the support extension extending from the sleeve, a winch cable having a hook mounted at one end thereof, the other end of the winch cable being attached to the winch, the winch cable extending upwardly to the sleeve, the winch cable extending upwardly along the sleeve and the support extension, the winch cable with hook extending downwardly from the end of the support extension, a means for hanging an animal mounted on the hook.

2. The field hoist of claim 1 wherein the support means comprises a receiver adapter adapted to be received into a vehicle receiver.

3. The field hoist of claim 2 wherein the receiver adapter has a horizontal leg, one end of the horizontal leg engaging a vehicle receiver, the post being mounted to the other end of the horizontal leg.

4. The field hoist of claim 1 wherein the support means comprises a receiver adapter adapted to be received into a receiver of a stand, the stand being adapted to rest on the ground.

5. The field hoist of claim 1 wherein the pivot locking means comprises a threaded hole positioned in the portion of the base which receives the post and a corresponding threaded pin, the threaded pin extending through the threaded hole to frictionally lock the post and the base together.

6. The field hoist of claim 5 wherein the threaded pin is provided with a handle extending laterally therefrom adapted to allow a user to engage and disengage the pin from the post.

7. The field hoist of claim 1 wherein the angled upright includes a first pair of aligned holes extending through opposing sides of the vertical portion proximate to the bottom thereof, the base includes a first plurality of pairs of corresponding holes which extend through opposing sides of the base, a first pin adapted to extended through the first pair of aligned holes and one of the first plurality of pairs of corresponding holes to lock the vertical portion to the base is a desired position.

8. The field hoist of claim 1 wherein the preselected angle is about 45 degrees.

9. The field hoist of claim 1 wherein a second pair of aligned holes extend through opposing sides of the sleeve proximate to the middle thereof, the support extension includes a second plurality of pairs of corresponding holes which extend through opposing sides of the support extension, a second pin adapted to extended through the second pair of aligned holes and one of the second plurality of pairs of corresponding holes to lock the support extension to the sleeve in a desired position.

10. The field hoist of claim 1 further comprising a support extension eyelet being provided at the uppermost portion of the support extension and extending downwardly therefrom, an angled upright eyelet being provided at the junction of the vertical portion and the sleeve directly above the winch, the winch cable extending through the support extension eyelet and the angled upright eyelet.

11. The field hoist of claim 1 wherein the animal hanging means is a spreader.

12. The field hoist of claim 1 further comprising a chair mounted to a chair sleeve, the chair sleeve being slidably received over the support extension.

13. The field hoist of claim 1 further comprising a bar mounted to a bar sleeve, the bar sleeve being slidably received over the support extension and secured thereto, the bar extending laterally from the support extension and supporting a plurality of meat hooks therefrom.

14. A field hoist for dressing an animal is provided, the field hoist comprising:

means for supporting the field hoist, the support means having a post extending upwardly therefrom, a base being slidably received over the post, the base having a winch and a means for locking a pivot mounted thereto, the base being freely rotatably about an axis defined by the post, the pivot locking means adapted to engage and disengage the post and the base in a desired angular orientation with respect to the axis, the pivot locking means comprising a threaded hole positioned in the portion of the base which receives the post and a corresponding threaded pin, the threaded pin extending through the threaded hole to frictionally lock the post and the base together, the threaded pin being provided with a handle extending laterally therefrom adapted to allow a user to engage and disengage the pin from the post, an angled upright having a vertical portion which is telescopically received within the base, the angled upright having a sleeve extending upwardly atop the vertical portion at a preselected angle of about 45 degrees towards the winch, the angled upright including a first pair of aligned holes extending through opposing sides of the vertical portion proximate to the bottom thereof, the base including a first plurality of pairs of corresponding holes which extend through opposing sides of the base, a first pin adapted to extended through the first pair of aligned holes and one of the first plurality of pairs of corresponding holes to lock the vertical portion to the base is a desired position, a support extension being slidably received within the sleeve, the support extension extending from the sleeve, a second pair of aligned holes extending through opposing sides of the sleeve proximate to the middle thereof, the support extension including a second plurality of pairs of corresponding holes which extend through opposing sides of the support extension, a second pin adapted to extended through the second pair of aligned holes and one of the second plurality of pairs of corresponding holes to lock the support extension to the sleeve in a desired position, a winch cable having a hook mounted at one end thereof, the other end of the winch cable being attached to the winch, the winch cable extending upwardly to the sleeve, the winch cable extending upwardly along the sleeve and the support extension, the winch cable with hook extending downwardly from the end of the support extension, a means for hanging an animal mounted on the hook.

15. The field hoist of claim 14 wherein the support means comprises a receiver adapter adapted to be received into a vehicle receiver.

16. The field hoist of claim 15 wherein the receiver adapter has a horizontal leg, one end of the horizontal leg engaging a vehicle receiver, the post being mounted to the other end of the horizontal leg.

17. The field hoist of claim 14 wherein the support means comprises a tripod.

18. The field hoist of claim 14 further comprising a chair mounted to a chair sleeve, the chair sleeve being slidably received over the support extension.

19. The field hoist of claim 14 further comprising a bar mounted to a bar sleeve, the bar sleeve being slidably received over the support extension and secured thereto, the bar extending laterally from the support extension and supporting a plurality of meat hooks therefrom.

20. A field hoist for dressing an animal is provided, the field hoist comprising:

a receiver adapter having a horizontal leg, one end of the horizontal leg being adapted to be received into a vehicle receiver for supporting the field hoist, the other end of the horizontal leg having a post extending upwardly therefrom, a base being slidably received over the post, the base having a means for locking a pivot mounted thereto, the base being freely rotatably about an axis defined by the post, the pivot locking means adapted to engage and disengage the post and the base in a desired angular orientation with respect to the axis, an angled upright having a vertical portion which is telescopically received within the base, the angled upright having a sleeve extending upwardly atop the vertical portion at a preselected angle;

a support extension being slidably received within the sleeve, the support extension extending from the sleeve, a winch cable having a hook mounted at one end thereof, the other end of the winch cable being attached to a winch mounted to the sleeve, the winch cable extending upwardly along the sleeve and the support extension, the winch cable with hook extending downwardly from the end of the support extension, a means for hanging an animal mounted on the hook.

\* \* \* \* \*